Patented Oct. 1, 1946

2,408,608

UNITED STATES PATENT OFFICE

2,408,608

CHLORINATED RESINS

Oliver W. Cass, Niagara Falls, N. Y., assignor to E. I. du Pont de Nemours & Company, Wilmington, Del., a corporation of Delaware No Drawing. Application May 24, 1943, Serial No. 488,214

2 Claims. (Cl. 260—86)

This invention relates to the preparation of certain new and useful chlorine-containing resinous materials. More particularly, it relates to the preparation of new and valuable resins by introducing chlorine into resins previously prepared by copolymerizing vinylidene chloride and vinyl chloride ("Saran" type resins).

Vinylidene chloride and vinyl chloride when mixed and subjected to polymerizing conditions form copolymers throughout the entire range of possible mixtures. These copolymers will vary in chlorine content from those of high vinyl chloride content containing approximately 57% chlorine to those of high vinylidene chloride content containing approximately 73% chlorine. Unfortunately all resins containing chlorine within this range, 57% chlorine content to 73% chlorine content, are not commercially utilizable because, as the chlorine content of these resins increases the softening point of the copolymer changes, decreasing from a softening point of approximately 78° C. for a copolymer containing 95% vinyl chloride—5% vinylidene chloride to a softening point of approximately 5° C. for a copolymer containing 45% vinyl chloride—55% vinylidene chloride. As the amount of vinyl chloride is still further reduced, thereby increasing the chlorine content of the resulting vinyl chloride-vinylidene chloride resin still further, the softening point again rises until, for a polymer containing 10% of vinyl chloride and 90% vinylidene chloride, the softening point is about 135° C. Those copolymers of low softening point covering the middle range in chlorine contents are practically useless from the commercial point of view.

In addition to this disadvantage characteristic of some of the vinylidene chloride-vinyl chloride copolymers, all of these copolymers suffer from inherent instability toward heat and for that reason tend to discolor to a substantial extent and liberate hydrogen chloride when subjected to high temperatures such as those encountered in molding operations. While this thermal instability may be counteracted to a greater or less extent by the incorporation with the copolymers of various stabilizers, even under the very best of conditions copolymers of the vinyl chloride-vinylidene chloride type must be regarded as unstable to heat.

One of the objects of this invention is the improvement of resins of the vinylidene chloride-vinyl chloride copolymer type whereby the low softening points of some of these resins are elevated and all are rendered more stable to heat by subjecting the copolymeric material to chlorination. Another object of this invention is the conversion of those vinylidene chloride-vinyl chloride copolymers of low softening points which are commercially valueless into valuable resinous polymeric materials by subjecting these resins to the action of chlorine whereby their chlorine contents are raised with an appreciable increase in their softening point. Still another object of this invention is the improvement of the heat stability and solubility characteristics of vinylidene chloride-vinyl chloride copolymers by the introduction of chlorine thereinto, thereby increasing the chlorine content of these copolymer resins. These and still further objects of this invention will be apparent from the ensuing disclosure of certain preferred embodiments thereof.

I have now discovered that both the low softening point characteristic of some of the vinylidene chloride-vinyl chloride copolymers, and the inherent instability toward heat of these resins, can be overcome by subjecting these copolymers to a chlorination treatment. In this way it is possible to increase the chlorine content of the copolymers thus markedly improving their properties when subjected to high temperatures, both when stabilizers of the previously mentioned type are present in the resins, and when such stabilizers are not so present. I have further discovered that the solubility characteristics of the copolymers are increased by the chlorination treatment in such a manner as to render the resins more useful and general in application.

The extent of chlorination required to secure these advantageous results will generally vary depending upon the individual vinylidene chloride-vinyl chloride copolymer being considered. However, I have found that the introduction of from 4 to 5% of chlorine for those copolymers containing relatively large amounts of vinylidene chloride, and the introduction of from 8 to 10% of chlorine into those copolymers containing relatively small amounts of vinylidene chloride will effect the desired improvements. Generally, therefore, I prefer to introduce from about 3% to 15% of chlorine into the vinylidene chloride-vinyl chloride copolymer, the larger amounts being introduced into those copolymers containing high vinyl chloride contents such as amounts of the order of 95%, while the lower amounts of chlorine are introduced into those resins containing relatively high amounts of vinylidene chloride such as amounts of the order of 90%, for example.

The chlorination may ordinarily be carried out by suspending the copolymeric material in an appropriate organic liquid such as carbon tetrachloride, which organic liquid may contain, if desired, a small amount of water as catalyst. The suspension of the copolymer in the organic liquid is then heated to a temperature high enough to initiate the reaction, temperatures in the range 60 to 70° C. being generally suitable. Gaseous chlorine is then passed into the suspension of copolymer while this suspension is subjected to the action of actinic radiation. The chlorinated polymers may be isolated as dry powders after the desired amount of chlorine has been introduced or, in those instances wherein the copolymer has been softened or dissolved by the solvent, methanol or other precipitant may be added to the cooled reaction mixture and the precipitated chlorinated copolymer removed by filtration. While these conditions of chlorination are given as illustrative, it is of course evident that other procedures may be utilized as will be appreciated by those skilled in the chlorination of organic compounds. The following examples are illustrative of certain preferred methods of carrying out my invention.

Example 1

950 parts of vinyl chloride and 50 parts of vinylidene chloride were introduced into a pressure vessel provided with means for agitation, heating, and cooling. In addition to this monomeric mixture the pressure vessel was charged with 3000 parts of water containing 5 parts ammonium persulfate and 5 parts of sodium bisulfite as polymerization catalyst.

The contents of the pressure vessel were agitated with heating until a temperature of 35° C. was attained. At this point polymerization began and the reaction vessel and its contents were maintained at a temperature within the range 40 to 45° C. until polymerization was complete. After about 2¼ hours the contents of the reactor were discharged and the polymerized mixture precipitated, filtered, and dried in the usual fashion. The yield of vinyl chloride-vinylidene chloride copolymer was 87.2% of the theoretical and the product had a chlorine content of 57.7%.

The resulting copolymer when subjected to an elevated temperature of 135° C. under molding conditions for two minutes gave a black brittle molding. The chromium-plated surfaces on the mold were badly discolored and attacked by the hydrogen chloride released. When a typical chloro-resin stabilizer was incorporated in 2% concentration with the copolymeric product and the material then subjected to molding conditions the product was still dark brown in color and the plates of the mold were stained by the liberation of corrosive fumes during the molding.

300 parts of the copolymer produced in accordance with the foregoing method was suspended in 4286 parts of carbon tetrachloride containing 7.5 parts of water. Chlorine gas was introduced into this stirred slurry over a period of thirteen hours, the material being brought into contact with actinic radiation by means of a light bulb. At the end of this period sufficient chlorine had been absorbed to raise the chlorine content of the vinyl chloride-vinylidene chloride copolymer from an initial value of 57.7% chlorine to 64.5% chlorine. At this point chlorination was stopped and residual chlorine and hydrogen chloride blown from the solution. The chlorinated copolymeric material was then precipitated by the addition of methanol to the cool solution, followed by filtration in order to recover the product.

The chlorinated copolymer containing 64.5% chlorine was then subjected to the identical molding conditions previously described. There resulted a clear light brown molded product in place of the black molded product resulting when the unchlorinated material was used. The molding temperature had to be increased approximately 20° C., moreover, in order to secure satisfactory molding and equivalent material flow, this increase in temperature being necessitated by the elevated softening point of the resin. When 2% of the same typical stabilizer was introduced into the chlorinated copolymer as previously utilized for the unchlorinated material, and the mixture molded under identical conditions, an optically clear colorless molded product was secured. Here again temperatures considerably above those required for molding the unchlorinated copolymer were necessitated by the increased softening point of the resin. In both cases the chromium-plated surfaces of the mold were not in any way attacked during the molding operation and retained their mirror-like finish throughout repeated molding cycles.

The unchlorinated copolymeric material dissolved in methyl ethyl ketone only to the extent of 10 to 12% at room temperature, while the solubility of the chlorinated copolymeric material in the same solvent was increased to 15%. This illustrates the superior solubility characteristics of the chlorinated copolymeric material. Films of the chlorinated copolymer containing 64.5% chlorine as cast from solvents were transparent and colorless.

Example 2

By following the procedure described in Example 1 a copolymer was prepared by utilizing as the monomeric material a mixture of 750 parts of vinylidene chloride and 750 parts of vinyl chloride. The resulting copolymer softened at room temperature and was practically valueless insofar as molding operations were concerned. When subjected to temperatures above room temperature the soft copolymeric resin turned black, simultaneously liberating large quantities of hydrogen chloride.

The copolymer was then subjected to chlorination under conditions identical with those given in Example 1. The chlorination was continued until the resulting product had a chlorine content of 73.3% compared with an initial chlorine content of 64 to 65%. The resulting copolymer of higher chlorine content was now capable of being molded at an elevated temperature yielding, even when agents tending to stabilize against the action of heat were not present, a light yellow somewhat brittle molded product. When the usual stabilizers were incorporated the molding was colorless and transparent. In neither case was there any evidence of corrosion of the chromium-plated surfaces of the mold. The resulting chlorinated copolymer, moreover, possessed improved solubility in the customary ketone solvents commercially utilized, both in regard to maximum solubility therein and to ease of solution.

Example 3

By following the same procedure described in Example 1 a mixture of 1200 parts of vinylidene chloride and 300 parts of vinyl chloride was copolymerized. The resulting copolymer had a chlorine content of 68.8% and unstabilized moldings prepared at 145° C. were dark brown in color.

By following the chlorination procedure described in Example 1, 300 parts of this copolymer were chlorinated until the chlorine content had been raised to 72.5%. When a stabilizer against heat instability was not present molded samples of this chlorinated resin were optically clear but light yellow in color. When 2% of a typical stabilizer against heat instability was present in the chlorinated copolymer, the resulting products prepared by molding at an elevated temperature were optically clear and water white in color.

As various changes may be made in the procedure as described without departing from the scope of my invention, it is intended that its purview should be determined in accordance with the appended claims.

I claim:

1. A polymeric product obtained by the chlorination of a copolymer of vinyl chloride and vinylidene chloride containing between 10% and 95% by weight of vinyl chloride with the remainder of said copolymer being vinylidene chloride, said polymer, as a result of said chlorination, having an increased percentage content of chlorine and an increased resistance to darkening at elevated temperatures.

2. A polymeric product obtained by the chlorination of a copolymer of vinyl chloride and vinylidene chloride containing between 10% and 95% by weight of vinyl chloride with the remainder of said copolymer being vinylidene chloride, said polymer, as a result of said chlorination, having 3% to 15% increase in content of chlorine, and an increased resistance to darkening at elevated temperatures.

OLIVER W. CASS.